United States Patent [19]

Burton

[11] 4,186,776
[45] Feb. 5, 1980

[54] PULSATION DAMPENER OR SURGE ABSORBER

[75] Inventor: James A. Burton, Houston, Tex.

[73] Assignee: Hydril Company, Los Angeles, Calif.

[21] Appl. No.: 955,929

[22] Filed: Oct. 30, 1978

[51] Int. Cl.² ............................................. F16L 55/04
[52] U.S. Cl. ..................................................... 138/30
[58] Field of Search ........................ 138/30, 26, 31, 27

[56] References Cited

U.S. PATENT DOCUMENTS

| | | | |
|---|---|---|---|
| 3,461,530 | 8/1969 | Cadion | 138/30 |
| 3,674,053 | 7/1972 | Murman et al. | 138/30 |
| 4,092,017 | 5/1978 | Urushiyama et al. | 138/30 |

*Primary Examiner*—Lenard A. Footland
*Attorney, Agent, or Firm*—Pravel, Gambrell, Hewitt, Kirk, Kimball & Dodge

[57] ABSTRACT

A new and improved pulsation dampener or surge absorber having an improved diaphragm or bladder is disclosed. The diaphragm is disposed within a pressure vessel for forming two non-communicating zones. The first zone communicates with the fluid having the undesired pulsations or surges while the second zone is precharged to a desired pressure level with a compressible fluid. The pressure vessel is secured with the conduit having the pulsating fluid and the diaphragm is disposed within the pressure vessel for preventing contact of the fluid having the pulsation with the pressure vessel to prevent corrosion of the pressure vessel. The inlet nozzle for the fluid having the pulsation which is subject to flow erosion as well as corrosion can thereby be replaced without replacing the pressure vessel securing means. The diaphragm is of the reverse folding type and is provided with shock absorber means on an inlet bridging disk to protect the diaphragm when the pulsating fluid pressure is reduced.

1 Claim, 1 Drawing Figure

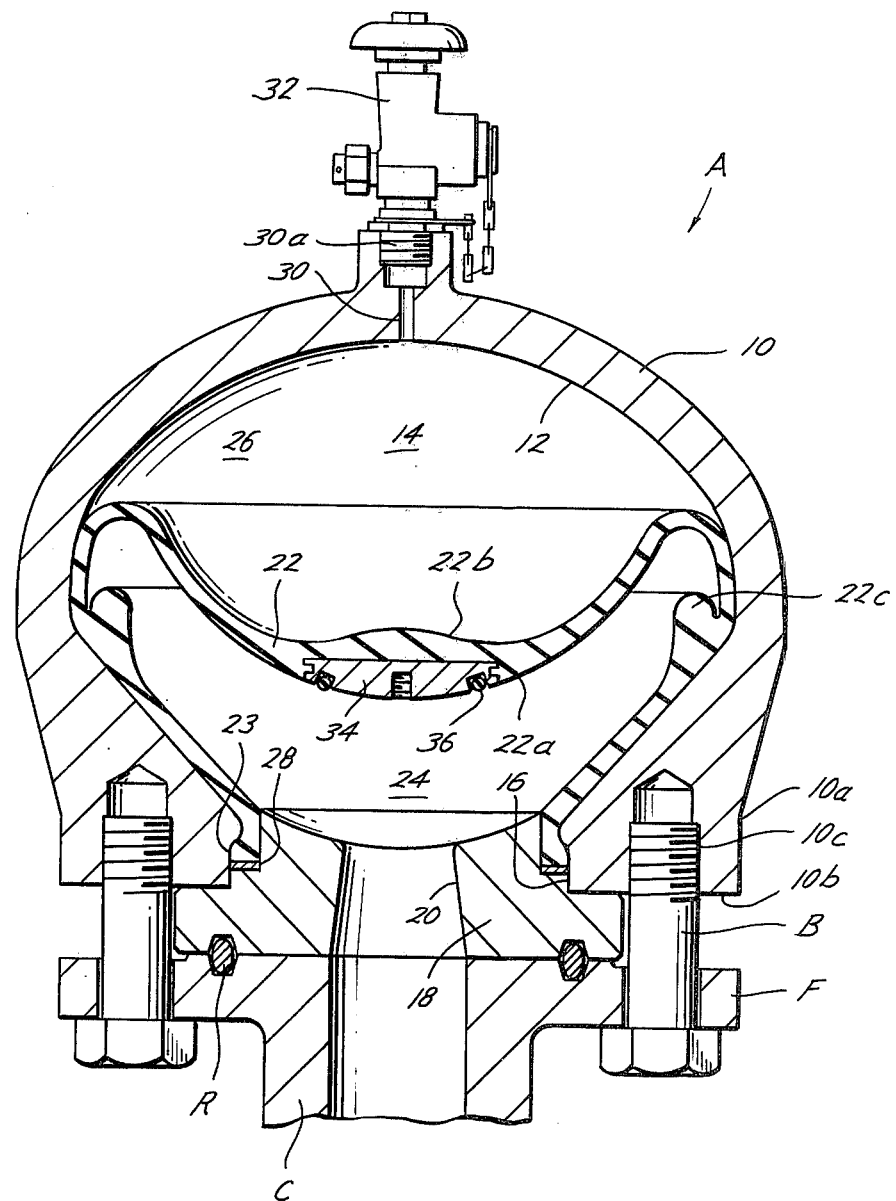

PULSATION DAMPENER OR SURGE ABSORBER

TECHNICAL FIELD

This invention relates generally to devices for reducing the pressure pulsations and pressure surges in confined fluids.

Such pressure pulsations may result in the discharge of a positive displacement pump while pressure surges may result in the closing of a fast-acting valve in a flowing stream of fluid. By eliminating the cyclic pulsation in a fluid the associated meters, valves, fittings and the pumps themselves have their service life increased as well as greatly improving the accuracy of meter readings of fluid conditions. Surge absorbers control any sudden pressure surges that may be caused by a pump start up or shutdown and also eliminates any surges in pipelines that may result from power failure or other causes. The surge absorbers are also indispensible to truck and tank car loading operations and for protecting airport fuel and hydrant systems.

Such pulsation dampeners or surge absorbers have usually comprised a pressure vessel or accumulator having a flexible diaphragm or bladder disposed within a cavity of the pressure vessel. A compressible fluid is precharged on one side of the diaphragm while the other side of the diaphragm is exposed to the fluid having the pressure pulsation or surges to be dampened.

While there is clear difference in application of the pulsation dampener and the surge absorber, the same apparatus, in fact, will serve both applications and a reference to one application herein will be understood to include the other application unless expressly excluded herein.

BACKGROUND ART

This invention relates to an improved pulsation dampener or surge absorber and an improved diaphragm for use in same.

The art of dampening the pressure surges or puslations in a stream of incompressible fluid has risen to a high level of skill. Examples of the technology of this art are reflected in the following patents that are assigned to the assignee of the present invention:

| U.S. Pat. No. | PATENTEE | ISSUE DATE |
| --- | --- | --- |
| 2,757,689 | Knox | Aug. 7, 1956 |
| 2,804,884 | Knox | Sept. 3, 1957 |
| 3,169,551 | Lewis | Feb. 16, 1965 |
| 3,674,053 | Murman | July 4, 1972 |
| 3,880,193 | Lewis | Apr. 29, 1975 |

While the embodiment disclosed in Knox U.S. Pat. No. 2,757,689 has been extremely successful, it did possess certain disadvantages. First, the inner wall of the pressure vessel was exposed to the fluid being pressure dampened which could be damaged if the dampening fluid was corrosive. Secondly, the mounting means for the pressure vessel was integral with the inlet for the fluid being pressure dampened. Thus, erosion and/or corrosion of the inlet nozzle by the pressure dampened fluid will require replacement of both the inlet nozzle and the securing means. As the latter item is relatively expensive to machine or form, the cost of repair of the pulsation dampener is also increased. U.S. Pat. Nos. 2,804,884 and 3,169,551 are similar in construction to the previously discussed Knox patent and possess the same disadvantages.

In Murman U.S. Pat. No. 3,674,053, the diaphragm is inverted for protecting the metal pressure vessel shell from the fluid being pressure dampened. The inlet nozzle is formed with the threads for connecting with a conduit containing the pulsating fluid. In addition, no means are provided to control wrinkling of the diaphragm when the reference fluid pressure greatly exceeds the fluid pressure of the fluid being pressure dampened.

Bladders or diaphragms are known which fold back or overlap themselves on one side under certain pressure conditions. One such example is disclosed in Peters U.S. Pat. No. 3,162,213. To control folding of the bladder or diaphragm, external stiffeners, such as disclosed in Overbeke U.S. Pat. No. 2,380,866, have been used.

In U.S. Pat. Nos. 2,378,467 and 2,397,248, both to DeKiss, there is disclosed accumulator bladders that overlap and which have integral molded annular ribs or beads which control the radius of curvature of the bladder at the fold. Such a rib is required because at low temperatures the diaphragm may become brittle and crack when folded flat upon itself without a radius of curvature being provided. In both DeKiss disclosures, the bladder is not arranged for isolating the pulsating fluid from the pressure vessel. The DeKiss patents also make a distinction between a bladder and a diaphragm type accumulator. In the present disclosure, however, it is to be understood that diaphragm and bladder are to be considered to be used interchangeably as the flexible separation element, unless expressly stated otherwise.

The Lippincott U.S. Pat. No. 2,397,796 also discloses a diaphragm having a rib to control the reverse bending to prevent cracking, but like the DeKiss patents, the fluid to be dampened is exposed to the pressure vessel.

SUMMARY OF THE INVENTION

The present invention relates to improved pulsation dampeners or surge absorbers and an improved diaphragm for use in the same.

The improved pulsation dampener is provided with a diaphragm that excludes the fluid having the undesired pressure surges from contact with the pressure vessel of the pulsation dampener to minimize corrosion. The reverse buckling diaphragm is provided with an annular lip to control the bending of the diaphragm in the reverse configuration. A bridge means are also provided on the diaphragm for bridging the inlet opening of the fluid having the undesired pulsation when the reference pressure in the diaphragm substantially exceeds the pressure of the fluid having the pulsation. Shock absorber means are mounted with the bridging means to reduce potentially damaging impact of the bridge disc and the inlet nozzle which is the only metal portion exposed to the fluid to be pressure dampened. In the event of erosion and/or corrosion of the flow inlet, it is only necessary to replace the inlet nozzle as the securing means for the pressure vessel to the conduit having the pulsating fluid is mounted with the pressure vessel shell and not with the inlet means.

BRIEF DESCRIPTION OF THE DRAWING

The FIGURE is a side view in section taken through the center of the improved pulsation dampener or surge absorber of the present invention and the improved diaphragm for use therein.

BEST MODE FOR CARRYING OUT THE INVENTION

The pulsation dampener or surge absorber is generally designated A in the FIGURE and includes a generally spherical pressure vessel shell 10 having an inner surface 12 defining a cavity 14. The pressure vessel shell 10 is provided with a first opening 16 in which is secured an inlet nozzle 18 having a flow passage 20 for permitting ingress and egress of fluid having the pulsation or surges into the cavity 14. Disposed in the cavity 14 is a flexible diaphragm or bladder 22 for dividing the cavity into an expansible lower or first zone 24 for the pulsating fluid and an upper expansible or second zone 26. The diaphragm 22 is provided with an annular lip 23a for securing and sealing the diaphragm 22 to the pressure vessel shell 10 and the inlet nozzle 18. A teflon ring 28 disposed adjacent the collar 23 prevents extrusion of the diaphragm collar 22a for assisting in holding the collar 23 in sealing and securing engagement between the pressure vessel shell 10 and the inlet nozzle 18.

Preferably, the pressure vessel 10 forms a cavity 14 that is substantially elliptical in cross-section, but a more circular cross-section cavity 14 may be provided. The limitations upon the form of the cavity 14 are controlled by the shaped of the diaphragm in that it is desirable that the diaphragm be supported by the pressure vessel wall 12 to prevent a pressure differential from being established across the diaphragm 22 which would lead to premature failure of the diaphragm 22.

The pressure vessel 10 is provided with a second opening 30 communicating with the upper zone 26. The opening 30 is threaded at 30a for receiving a pressure control valve 32 therein. A suitable pressure control valve is the Model No. 798 manufactured by Schroeder Automotive Products Division of Scoville Corporation in Dixon, Tennessee. The valve 32 serves to admit a compressible fluid at a preselected pressure in the upper zone 26 for a purpose to be described more fully hereinafter.

The pressure vessel sheel is preferably of welded steel construction and provided with a thickened wall portion 10a adjacent the opening 16. The thickened wall section 10a terminates in a downwardly facing annular shoulder surface 10b which engages the inlet nozzle 18. The shoulder 10b is drilled and tapped with a plurality of equicircumferentially spaced drilled and tapped openings 10c corresponding to the bolt opening O on mating pipe flange F for receiving threaded bolts B in the usual manner. The pipe flange F may be provided with a gasket ring R for sealing between the flange F and the inlet nozzle 18 in the usual manner. By securing the pressure vessel 10 to the flange F by bolts B the securing means of the pulsation dampener A are not exposed to the fluid in the conduit or pipe C attached to the flange F. In this manner, pulsating fluid contained in the conduit C will be communicated into the first zone 24 below the diaphragm 22.

The diaphragm is provided with a first or inner surface 22a that is exposed to the fluid pressure in the lower zone 24 for urging the diaphragm upwardly into engagement with the inner surface 12 of the pressure vessel 10 when the pressure in the lower zone 24 exceeds the pressure in the upper zone 26. When the pressure in the upper zone 26 exceeds the pressure in the lower zone the pressure in the chamber 26 will urge on a second or outer surface 22b of the diaphragm for moving the diaphragm to fold back upon itself with the inner surface 22a folding back upon itself and engaging the inlet nozzle 18. Molded in the diaphragm 22 is a bridging disk 34 that covers the inlet opening 20 for supporting the diaphragm 22 when the pressure in the upper zone 26 exceeds the pressure in the lower zone 24 and the conduit C. Mounted on the bridging disk 34 is an O-ring 36 that protrudes outwardly from disk 34 to provide a shock absorbing means as the metal bridging disk 34 engages the metal inlet nozzle 18.

To control the radius of curvature of the diaphragm 22 as it folds back upon itself with the inner surface 22a an annular ring 22c is molded on the inner surface 22a. The ring 22c tends to prevent the diaphragm 22 from tearing as it folds back when the bridge plate 34 seats on the inlet nozzle 18. Also, the diaphragm 22 is substantially thicker in the area between the rib 22c and the annular securing collar 22a in order to preclude the fluid pressure in the second zone 26 from urging on the diaphragm second surface 22b below the annular ring 22c and which also aids in maintaining the diaphragm sealed against the pressure vessel 10 inner surface 12 at the rib 22c.

OPERATION

In the use and operation of the present invention the inlet nozzle is positioned on the flange F with the diaphragm 22, inlet nozzle 18 and pressure vessel 10 in the condition generally illustrated in the FIGURE. The bolts B are then inserted through the openings O of the flange F for engaging the threads 10c of the pressure vessel 10 for securing the pressure vessel 10 to the flange F. The upper zone 26 is then charged to the desired operating pressure with a compressible fluid by use of the valve 32 in the known manner. The compressible fluid introduced in the upper chamber 26 through the opening 30 and the valve 32 serves as the urging or fluid resilient means for the pulsation dampener A. With the upper zone charged to the proper operating pressure, the fluid whose pulsations or surges are to be dampened are introduced into the conduit C at the desired operating pressure where they will urge upwardly on the trapped compressible fluid in the upper zone 26 to move the diaphragm 22 to the position illustrated.

As the fluid in the conduit C pulses or surges into the lower chamber 24 erosion and/or corrosion of the inlet nozzle 18 may occur. However, the diaphragm 22 will protect the pressure vessel shell 10 from contact with the fluid being pulsated. When it is necessary to replace the inlet nozzle 18 it is only necessary to replace that item and not the securing means which are isolated from the corrosive fluids and which provides a more simplified and lighter pulsation dampener A.

The foregoing disclosure and description of the invention are illustrative and explanatory thereof, and various changes in the size, shape and materials as well as in the details of the illustrated construction may be made without departing from the spirit of the invention.

I claim:

1. A pulsation dampener for dampening undesired pressure changes in a fluid, including:
   a pressure vessel forming a cavity means for receiving and containing fluid under pressure in said cavity means, said pressure vessel having a first opening and a second opening formed therethrough;

an inlet nozzle disposed in said first opening and having a flow passage for permitting ingress and egress of fluid subject to the undesired pressure changes from said cavity means through said flow passage;

a flexible diaphragm disposed in said cavity for dividing said cavity means into a first zone for receiving a first fluid and a second zone for receiving a second fluid, said first zone communicating with said flow passage of said first inlet nozzle;

said second opening communicating with said second zone;

means operably mounted with said pressure vessel for controlling the fluid pressure in said second zone;

means formed on said pressure vessel for securing said pressure vessel with a conduit having the fluid subject to pressure changes for communicating the fluid subject to the undesired pressure changes through said flow passage of said inlet nozzle to said first zone; and said inlet nozzle sealingly secured to the conduit and said pressure vessel by said means for securing said pressure vessel wherein replacement of said inlet nozzle does not require replacement of said means for securing said pressure vessel; and wherein said diaphragm seals with said inlet nozzle to limit contact of the fluid subject to the undesired pressure changes in the first zone to only the inlet nozzle and diaphragm to protect the pressure vessel from corrosion or flow erosion by the fluid subject to the undesired pressure changes; said diaphragm having a diaphragm pressure reinforcement molded thereon for bridging said flow passage to support said bladder when the fluid pressure in said second zone exceeds the fluid pressure in said first zone to reduce the adverse effect of differential pressure on said bladder; said diaphragm having having having an annular rib formed thereon for forming a radius of curvature for said bladder as the first zone decreases in size relative to the second zone; and wherein said diaphragm pressure reinforcement is a metal disk; and said shock absorbing means including an O-ring mounted with said metal disk; and wherein said means for securing said pressure vessel comprises a collar and polytetrafluoroethylene ring, and maintains said inlet nozzle in sealing engagement with the conduit to prevent leakage of fluid between said inlet nozzle and the conduit when communicating the fluid subject to the undesired pressure pressure changes through said flow passage of said inlet nozzle to the first zone.

* * * * *